United States Patent [19]
Chovan

[11] Patent Number: 6,062,825
[45] Date of Patent: May 16, 2000

[54] AIR COMPRESSOR AFTERCOOLER WITH AUTOMATIC HEATED DRAIN VALVE AND START-UP SHUT-OFF

[76] Inventor: Dale A. Chovan, 219 McWilliams Rd., Trafford, Pa. 15085-9770

[21] Appl. No.: 09/010,090

[22] Filed: Jan. 21, 1998

[51] Int. Cl.[7] ..................................................... F04B 23/00
[52] U.S. Cl. .......................... 417/243; 417/313; 165/111; 165/302
[58] Field of Search .................................... 417/243, 293, 417/313; 165/111, 302, 47

[56] References Cited

U.S. PATENT DOCUMENTS

| | | | |
|---|---|---|---|
| 5,718,563 | 2/1998 | Hutchinson | 417/243 |
| 5,894,881 | 4/1999 | Wagner et al. | 417/243 |
| 5,941,271 | 8/1999 | Chovan | 137/204 |
| 5,971,063 | 10/1999 | Treppler | 165/302 |

Primary Examiner—Timothy S. Thorpe
Assistant Examiner—Cheryl J. Tyler
Attorney, Agent, or Firm—James Ray & Associates

[57] ABSTRACT

A water release system includes a compact aftercooler connected to receive hot, moisture laden compressed air from a compressor having a load cycle under control of a governor. A water release valve is connected between a header of the aftercooler and an unloader pressure line connected to the governor. The valve ordinarily remains open until it receives a certain, pressure value signal from the unloader line which is effective to close the valve. A switch is located in pressure sensing relationship with the aftercooler, and a solenoid valve is electrically connected to the pressure sensitive switch and pneumatically connected between the water release valve and the governor. When the pressure sensed by the switch is somewhat above that at which the water release value ordinarily closes, the pressure sensitive switch closes to energize the solenoid valve and thereby open the same, after which the water release valve operates automatically to open and close in response to pressure and lack thereof in the unloader line.

4 Claims, 1 Drawing Sheet

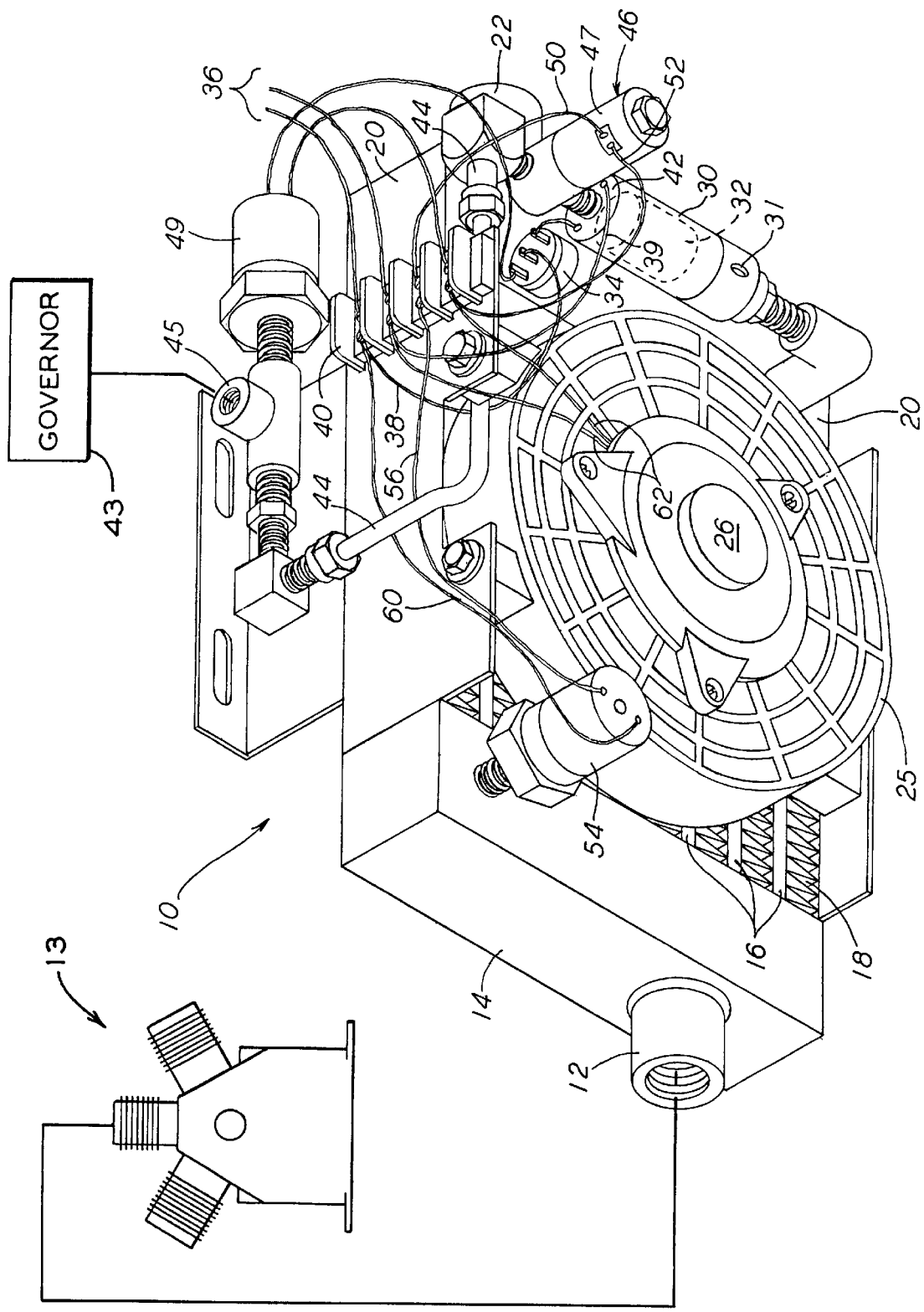

AIR COMPRESSOR AFTERCOOLER WITH AUTOMATIC HEATED DRAIN VALVE AND START-UP SHUT-OFF

FIELD OF INVENTION

The present invention relates generally to aftercoolers connected to receive hot, moisture-laden compressed air from a compressor, and more particularly to a compact aftercooler for a variety of systems using compressed air at an air flow rate of less than about thirty cubic feet per minute (CFM). Compressed air systems are used extensively in the United States and throughout the world, and all such systems acquire moisture in the process of compressing ambient air. Condensing of this moisture to liquid water, and removal of the same from such systems is necessary, as explained hereinafter.

BACKGROUND OF THE INVENTION

Ambient outside air is drawn into an air compressor in the process of compressing air. All of the constituent gases and vapors in the ambient atmosphere, including moisture (water vapor), enter the compressor in the same proportion as the proportions in the outside ambient.

For example, if a compressed air system provides air at a normal gauge pressure of 120.0 psi, and the ambient atmosphere has an absolute pressure value of 14.7 psi, the absolute pressure has increased by a factor of about nine. Vapors in the atmosphere, notably water vapor, which may be at a partial pressure below the dew point of the temperature of the ambient atmosphere, are compressed to a partial pressure which is increased nine-fold, and may greatly exceed the dew point for air at the temperatures in the compressed air system. Hence, the vapors, notably water vapor, condense in the compressed air system, causing liquid water to collect at low points in the system.

Liquid water has a density that is greater than air, and hence acts very differently from air when the water flows through valves, conduits and orifices in a compressed air system. Indeed, if a mixture of compressed water and air flow through an orifice or valve, the air may drive discrete masses of water at high speed, which can erode internal surfaces causing noise and damaging systems.

In addition, water corrodes various materials of systems using compressed air, and most dangerously can freeze and reduce or negate brake action in air brake systems.

Hence, it is necessary to rid compressed air systems of liquid water. Compressed air systems on trucks, for example, generally have manual water release valves which are opened occasionally or regularly to eject liquid water, or a mixture of water and air. Presently, trucks employed in the U.S. and elsewhere commonly use a desiccant dryer for removing moisture in compressed air received from the truck's compressor that provides pressurized air for the truck's brake system. Water removed from the compressed air by the desiccant dryer is periodically expelled from a sump of the dryer and thus from the system. The compressor operates under a load cycle controlled by a governor that senses the level of air pressure in a reservoir. When pressure in the reservoir falls to a preset level, the governor calls for a supply of pressurized air from the compressor; when air pressure is restored, the governor orders cessation of the supply of pressurized air from the compressor. The compressor itself is often gear-driven by the internal combustion engine of the truck.

SUMMARY OF THE INVENTION

The present invention uses an aftercooler to reduce the temperature of hot compressed gases received from a compressor to near ambient, i.e., to within seven or eight degrees of ambient or closer, for the purpose of condensing water vapor to liquid water so that the liquid water can be expelled from a compressed air system. The aftercooler can replace desiccant dryers which are generally inadequate when and if liquid water reaches the desiccant, i.e., desiccant particulates are effective in adsorbing moisture in the form of water vapor but become inoperable when contacted by liquid water. If liquid water contains oil, such as an emulsion of water, oil and air, the desiccant particulates are rendered completely inoperable as an adsorbent whereas the particles can be dried and thereby "revived" by heat if they are contacted only by liquid water.

Aftercoolers, generally, are comprised of a plurality of finned tubes connected to a first header that receives hot, moisture-laden gases from a compressor. The finned tubes cool the moisture-laden gases and thereby condense water vapor to liquid water, which water is collected in a second header located at the ends of the tubing opposite the first header. The condensing function is such that it actually rains in the aftercooler.

The aftercooler in the present invention is a small, lightweight, compact unit on the order of 14"×12"×7", which is somewhat larger than the size of a book. A small motor driven fan is mounted on one face of the aftercooler to assist in the cooling effort provided by the aftercooler. With the motor and fan, the unit of the invention weighs only about twelve pounds.

In the present invention, the second header of the compact unit is connected to an automatic drain valve which can be of the type disclosed in applicant's pending U.S. application Ser. No. 08/794,849 entitled "Water Release Valve." The disclosure of this application and of a divisional application filed Jan. 6, 1998 are incorporated herein by reference.

In addition, the present drain valve is provided with a wrap-around heater to ensure water flow from the drain valve when the valve is operated in freezing conditions with the heater being under control of an electrical thermostat. The water release valve, in the present invention, is shut off during start-up by a solenoid control valve which begins the build-up of pressure in the compressor. Such water release or shut-off valve is also under control of a switch located to sense the level of the pressure of the compressed air in the aftercooler, i.e., the pressure switch keeps the solenoid valve open when pressure builds to a certain level in the aftercooler such that the water release valve is maintained in fluid communication with an unloader line that loads and unloads pressure in the compressor, and pneumatically signals the water release valve to release liquid water in each load/unload cycle of the compressor.

OBJECTS OF THE INVENTION

A primary objective of the invention, therefore, is to provide a small, compact aftercooler for medium size compressors providing less than thirty cubic feet per minute airflow to ensure removal of liquid water from systems receiving compressed air from the compressors.

Another objective of the invention is to substitute such an aftercooler for desiccant dryers.

Yet another objective of the invention is to provide means for shutting off the drain valve when an engine or motor driving the compressor is started and pressure builds in the system connected pneumatically to the compressor.

THE DRAWING

The invention, along with its objectives and advantages, will be better understood from consideration of the following detailed description and the accompanying drawing, the sole FIGURE of which is an isometric view a compact aftercooler having a thermostatically controlled heated drain valve and a start-up shut-off valve.

PREFERRED EMBODIMENT OF THE INVENTION

Referring now to the FIGURE of the drawing, an aftercooler 10 is shown having an input pipe 12 connected to receive hot, moisture laden gases from a compressor (not shown). The moisture laden gases enter a first header 14 of the aftercooler from pipe 12 where the gases collect and enter a plurality of tubes 16, with fins 18, connected to the header.

Tubes 16 extend to a second header 20 where compressed gases are collected after leaving the tubes for direction to an output pipe or nipple 22. Pipe 22 extends and is connected to a reservoir (not shown) for storing the compressed gases from aftercooler 10 which are now cooled to a temperature value near that of ambient. The reservoir supplies the stored air to systems using such air. The finned tubes provide the cooling which causes water vapor (moisture) contained in the gases received in first header 14 to condense to liquid water, which collects in a low end of second header 20. Additional cooling can be provided by a fan 25 driven by an electrical motor 26, only the rear of which is visible in the drawing. Such a motor can be powered by battery (DC) current or AC current.

Connected to second header 20 is an automatic drain valve 30 which operates momentarily to expel air and liquid water from the valve via an exhaust opening 31 provided in the valve that the valve receives from header 20, i.e., the valve expels liquid water received in the low point of header 20. A valve suitable for this purpose is the valve disclosed in the above pending applications of the present applicant. After the valve opens and expels the water in the valve, the valve quickly closes to maintain "operating" air pressure at and in output pipe 22 that supplies compressed air to systems using the air which is now generally free of liquid water. This liquid-free air can be used in a variety of compressed air systems requiring the removal of water.

A wrap-around heating means 32 (shown schematically in dash outline in the drawing) is located on an interior valve body (not visible in the drawing) of the drain valve to maintain the interior temperature of the valve above freezing when ambient conditions are at or below freezing. (The interior valve body is disclosed in the above cited pending applications, and is enclosed by a sleeve in the manner shown in the applications) The wrap-around heater ensures water flow from the valve, i.e., from port 31, under freezing conditions.

Heating means 32 is preferably thermostatically controlled such that when ambient conditions are above freezing, electrical current can be removed from the heating means. For this purpose, three terminal thermostat 34 is electrically connected between heating means 32 and a source of electrical power, such as the twelve volts supplied by a truck battery. In the drawing, two leads 36 supply the electrical power, and are shown connected to electrical leads 38 and 39 via a terminal strip 40. Lead 38 is connected to a center terminal of the thermostat, while lead 39 connects to one side of heater 32. The other side of the heater is connected to an outer terminal of the thermostat. A second outer terminal of the thermostat is connected to a pressure sensitive switch 49, via a lead 41. (The function of switch 49 is discussed in detail below). The thermostat, when closed to heater 32, supplies electrical current to the heater from lead 38, while lead 39 provides a return path to one of power leads 36.

The thermostat also controls the supply current to fan motor 26, as discussed hereinafter. In this manner the thermostat functions as a single pole, double-throw switch.

In the drawing, thermostat 34 is shown located separately from valve 30 but can be located in the housing of the valve.

Preferably, heating means 32 is comprised of electrically resistive wires embedded in a small silicone rubber blanket. The blanket is simply wrapped around the internal body of valve 30, and secured on the internal valve body by the outside sleeve shown in applicant's above pending applications. The sleeve is sized to slip over the blanket and secure the same in place around the valve body.

Drain valve 30 has a control port 42 pneumatically connected to an unloader line (pipe or conduit) 44. (In the, a drawing, a control valve 46 is shown pneumatically connected between the drain valve and the unloader line for purposes explained hereinafter). Unloader line 44, in turn, is connected at nipple 45 to a governor (not shown) that controls loading and unloading of the compressor, i.e., when air pressure in the air brake system of a truck, for example, falls to a preset lower value, the governor senses the lower value and loads the compressor to begin the build-up of air pressure; when the air pressure reaches a preset upper value, the governor senses the preset upper pressure value and turns off the compressor.

Unloader line 44 is also pneumatically connected to a pressure sensitive solenoid switch 49 that controls the electrical operation of fan motor 26 in a manner described hereinafter.

Aftercooler 10, fan motor 26 and drain valve 30 operate in the following manner. Unloader line 44 informs drain valve 30 via its control port 42 of each on-off (load and unload) cycle of the compressor so that water can be exhausted from the drain valve, and thus from aftercooler 10, for each such operating cycle of the compressor.

If drain valve 30 is of a type that requires its control port 42 to be closed during start-up of the compressor, from zero psi, for example, for the purpose of closing water exhaust port 31, a solenoid operated control valve 46 can be serially pneumatically connected between control port 42 of the drain valve and unloader line 44, as shown. The solenoid of valve 46, indicated by numeral 47, is shown electrically connected to terminal strip 40 by leads 50 and 52. Lead 50 is also connected to a pressure sensitive switch 54 via a lead 56 shown connected to terminal strip 40. In the drawing, switch 54 is pneumatically connected to first header 14 of aftercooler 10.

In its de-energized state the solenoid 47 of control valve 46 is normally closed which closes ports 31 and 42 of drain valve 30, i.e., the de-energized solenoid keeps port 42 closed which maintains port 31 of the drain valve closed so that the compressor can build pressure for utilization in a compressed air system and, thereafter, for normal operation thereof.

Pressure switch 54 is electrically connected between the normally de-energized solenoid 47 of control valve 46 and a source of voltage provided by a truck battery, for example, via leads 36 and a lead 60 (connected at terminal strip 40), and via leads 50 and 56 (also connected to the terminal strip). Ordinarily, the drain valve 30 exhausts air and water during initial start-up of the compressor, and its exhaust port 31 will remain open to about forty five psi if its control port 42 is not closed. In the present invention, solenoid valve 46 keeps exhaust port 31 closed until switch 54 senses a certain pressure in header 14 of aftercooler 10, and when such pressure builds to about sixty psi, a safe increment about the drain valve closing pressure of forty-five psi, switch 54 closes to apply a voltage, via leads 50, 52, 56 and 60, to the normally de-energized solenoid 47 to open exhaust port 31 of the drain valve. Liquid water in header 20 of aftercooler 10 is quickly expelled through exhaust port 31 under pressure of the compressed air in the aftercooler before the drain valve automatically closes by its own internal action. Solenoid valve 46 will stay open continuously above sixty psi and during any governor operation in building and exhausting air in tube connection or nipple 45 will cause drain valve 30 to operate through its own internal valve action for each building and exhausting (loading and unloading) of compressor air.

Pressure switch 49 is pneumatically connected to governor connection 45 and is used to supply electrical current to fan motor 26 when the pressure at governor connection 45 falls to zero psi, and to stop operation of the fan and motor when governor connection pressure rises to its upper pressure limit, which is usually 120 psi. In this manner, when the compressor begins supplying aftercooler 10 with moisture laden gases, fan 25 is operated via electrical leads 62 to cool aftercooler tubes 16 and thereby condense the moisture to liquid water.

As discussed earlier switch 49 is also electrically connected to an outer terminal of thermostat 34, via lead 41. When ambient temperature is above freezing, the portion of the thermostat connected to leads 38 and 41 closes to complete the circuit to fan motor 26, i.e., lead 38 conducts current from one of the power leads 36 to the center terminal of the thermostat, and current flows through the thermostat to and through lead 41 to one side of switch 49. With switch 49 closed, current flows through the switch and through a lead 43 to one power lead 62 of the motor. The other motor lead 62 is connected the other power lead 36.

With the ambient above freezing, the portion of thermostat connected between heater 32 and lead 38 is open so that no current is conducted to the heater.

When the ambient falls to freezing, thermostat 34 reverses the above electrical connections such that motor 26 is rendered inoperable and heater 32 operable. It can be appreciated that if the blades of fan 25 are covered with ice, from road spray for example, motor 26 may be loaded to the extend that it will fail.

With the pneumatic and electrical connections depicted in the drawing, liquid water is expelled from header 20 via drain valve 30, after which the control valve 46 operates to close the drain valve so that air is not needlessly exhausted from system and air pressure can build to the level sensed by switch 54. Above such level control valve 46 operates to open port 42 to allow drain valve 30 to respond to the load/unload pressures available at connection 45.

Aftercooler 10 efficiently condenses the moisture it receives from a compressor to liquid water so that such liquid water can be expelled from the aftercooler via drain valve 30, thereby preventing liquid water from entering air operated systems connected to the air output nipple 22 of the aftercooler.

While the presently preferred embodiment for carrying out the instant invention has been set forth in detail above, those persons skilled in the art to which this invention pertains will recognize various alternative ways of practicing the invention without departing from the spirit and scope of the claims appended hereto.

What is claimed is:

1. A water release system for use in a compressed air system, comprising:

a compact aftercooler connected to receive hot, moisture-laden compressed air from a compressor having a load cycle under control of a governor, a water release valve connected to a header of the aftercooler, and to an unloader pressure line connected between said valve and governor, a first switch located in pressure sensing relationship with the aftercooler for sensing air pressure within the aftercooler, and a solenoid valve electrically connected to the pressure sensitive switch and pneumatically connected between the water release valve and said unloader line, said pressure sensitive switch being effective to energize said solenoid valve and thereby open the solenoid valve when pressure sensed by said switch exceeds a predetermined value such that the water release valve is connected in fluid communication with the unloader pressure line.

2. The water release system of claim 1 wherein the water release valve is heated by a heater located in physical contact with a body of the valve and electrically connected to a source of electrical power under control of a thermostat and electrically connected in series between said heater and the source of electrical power.

3. The water release system of claim 1 wherein the aftercooler unit includes a motor driven fan for cooling the hot, moisture laden compressed air received in the aftercooler from the compressor when the compressor operates and compresses air.

4. The water release system of claim 3 including a second switch pneumatically connected to the unloader line, and electrically connected to supply and interrupt electrical current to and from the motor of said fan in accordance with the level of pressure in the unloader line as sensed by said second switch.

* * * * *